United States Patent
Sallaway et al.

(10) Patent No.: US 12,537,552 B2
(45) Date of Patent: Jan. 27, 2026

(54) HIGH-POWER ANALOG INTERFERENCE CANCELLATION

(71) Applicant: TrellisWare Technologies, Inc., San Diego, CA (US)

(72) Inventors: Peter James Sallaway, San Diego, CA (US); Bruce Coy, San Diego, CA (US); Cenk Köse, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 376 days.

(21) Appl. No.: 18/023,527

(22) PCT Filed: Aug. 27, 2021

(86) PCT No.: PCT/US2021/048031
§ 371 (c)(1),
(2) Date: Feb. 27, 2023

(87) PCT Pub. No.: WO2022/076104
PCT Pub. Date: Apr. 14, 2022

(65) Prior Publication Data
US 2023/0318647 A1 Oct. 5, 2023

Related U.S. Application Data

(60) Provisional application No. 63/071,303, filed on Aug. 27, 2020.

(51) Int. Cl.
*H04B 1/525* (2015.01)
*H04B 1/12* (2006.01)

(52) U.S. Cl.
CPC .................................. *H04B 1/123* (2013.01)

(58) Field of Classification Search
CPC .......... H04B 1/06; H04B 1/10; H04B 1/1027; H04B 1/1036; H04B 1/109; H04B 1/12; H04B 1/123; H04B 1/16
See application file for complete search history.

(56) References Cited

U.S. PATENT DOCUMENTS

| | | | |
|---|---|---|---|
| 8,290,100 B2 * | 10/2012 | Komninakis | H04B 1/109 455/189.1 |
| 8,401,509 B1 * | 3/2013 | Gupta | H04B 1/10 455/305 |

(Continued)

OTHER PUBLICATIONS

International Search Report and Written Opinion dated May 3, 2022 for International Application No. PCT/US2021/048031, 9 pages.

(Continued)

*Primary Examiner* — Quochien B Vuong
(74) *Attorney, Agent, or Firm* — Perkins Coie LLP

(57) ABSTRACT

Methods, systems and devices for interference cancellation of high-power input signals in the analog domain are described. An example method of interference cancellation includes receiving, via an antenna, an analog signal comprising a signal of interest and one or more interfering signals, wherein the one or more interfering signals comprises a high-power interfering signal with a signal power greater than 15 dBm, determining, based on a reference signal corresponding to the high-power interfering signal, an update to at least one parameter of the reference signal, wherein the update is determined by minimizing a cost function of a difference between the reference signal and the high-power interfering signal, generating, based on the update to the at least one parameter, a modified reference signal, and generating, based on coupling the modified reference signal to the analog signal, an interference-canceled signal comprising the signal of interest.

18 Claims, 8 Drawing Sheets

(56) References Cited

U.S. PATENT DOCUMENTS

| | | | |
|---|---|---|---|
| 8,565,681 B2 * | 10/2013 | Kim | H04B 1/525 455/296 |
| 9,407,298 B1 * | 8/2016 | Hwang | H04B 1/10 |
| 2013/0309975 A1 | 11/2013 | Kpodzo et al. | |
| 2015/0011172 A1 | 1/2015 | Reinhardt | |
| 2016/0269061 A1 | 9/2016 | Hwang et al. | |
| 2017/0250729 A1 | 8/2017 | Köse et al. | |

OTHER PUBLICATIONS

Extended European Search Report mailed Sep. 13, 2024 for European Patent Application 21878189.6, 12 pages.

* cited by examiner

HIGH-POWER ANALOG INTERFERENCE CANCELLATION

CROSS-REFERENCE TO RELATED APPLICATION

This application is a 35 USC § 371 National Stage application of International Application No. PCT/US2021/048031, entitled "HIGH-POWER ANALOG INTERFERENCE CANCELLATION," filed on Aug. 27, 2021, which claims benefit of U.S. Provisional Patent Application No. 63/071,303 filed on Aug. 27, 2020, the entire contents of which are incorporated herein by reference and relied upon.

TECHNICAL FIELD

This patent document generally relates to wireless networks, and more specifically, to interference cancellation in wireless networks.

BACKGROUND

Communication systems operating in tactical environments are often subject to high-power radio frequency (RF) interference that adversely impact the transmission and reception of low-power information signals. Analog interference cancellation is used to recover the low-power information signals so that receiver analog front-end interface is not be saturated or damaged. Using high-power analog interference cancellation can significantly improve the communication capabilities of tactical networks.

SUMMARY

This patent document relates to analog interference cancellation of high-power interference. Embodiments of the disclosed technology can be configured to cancel interference that is significantly more powerful than the signal of interest that is being detected by the receiver in a tactical environment, which advantageously improves communication capabilities.

In an example, a method of interference cancellation includes receiving, via an antenna, an analog signal comprising a signal of interest and one or more interfering signals, wherein the one or more interfering signals comprises a high-power interfering signal with a signal power greater than 15 dBm, determining, based on a reference signal corresponding to the high-power interfering signal, an update to at least one parameter of the reference signal, wherein the update is determined by minimizing a cost function of a difference between the reference signal and the high-power interfering signal, and wherein the at least one parameter comprises a gain, a phase, or a delay, generating, based on the update to the at least one parameter, a modified reference signal, and generating, based on coupling the modified reference signal to the analog signal, an interference-canceled signal comprising the signal of interest.

In another example, a device for interference cancellation includes a high-power analog interference canceller configured to receive (a) a first wireless signal comprising a signal of interest and one or more interfering signals and (b) a reference signal corresponding to a first interfering signal of the one or more interfering signals, wherein the first interfering signal is a high-power interfering signal with a signal power greater than 15 dBm, and output an interference-canceled signal comprising the signal of interest and a residual of the first interfering signal, a radio-frequency stage configured to amplify and filter the interference-canceled signal to generate an amplified and filtered interference-canceled signal, wherein the amplifying and filtering comprises boosting the signal of interest and removing out-of-band interference, and a digital interference canceller configured to perform a digital interference cancellation operation on the amplified and filtered interference-canceled signal.

In yet another example, the above-described methods are embodied in the form of processor-executable code and stored in a computer-readable program medium.

In yet another example, a device that is configured or operable to perform the above-described methods is disclosed.

The above examples and other aspects and their implementations are described in greater detail in the drawings, the descriptions, and the claims.

DETAILED DESCRIPTION

A primary source of degradation for military radio frequency (RF) communication systems is interference. RF interference can result from strong collocated adjacent-channel emissions, e.g. due to a tactical blue jammer operating on the same vehicle with a radio receiver. For a networked communication system, such interference may also degrade the performance of remote radios. The presence of adversarial (red) jammers, indigenous signals and other tactical networks on the same or near-by channels further complicate the remote interference scenario.

Interference due to collocated emissions can be many tens of dBs stronger than received signal-of-interest (SOI) levels, overwhelming or otherwise significantly diminishing the operating dynamic range of unprotected receivers. Remote interference is typically much weaker and has a smaller impact to the receiver dynamic range; but it can nonetheless be detrimental to link performance unless excess link-margin is available. In general, the power and bandwidth signature of RF interference is unknown a priori. As a result, resilient operation in congested and contested RF environments calls for interference cancellation solutions, whose aim is to excise unwanted RF energy before it reaches data detection circuits.

Interference cancellation (IC) for satellite communication (SATCOM) RF links must be especially accurate due to stringent operating link margins, typically no more than a few dBs. In order to minimize degradation to receiver sensitivity, SATCOM IC solutions need to operate with commensurate low noise figure (NF), and in a manner that preserves overall receiver linearity, as uncompensated distortions further erode link margin.

Figure 1:
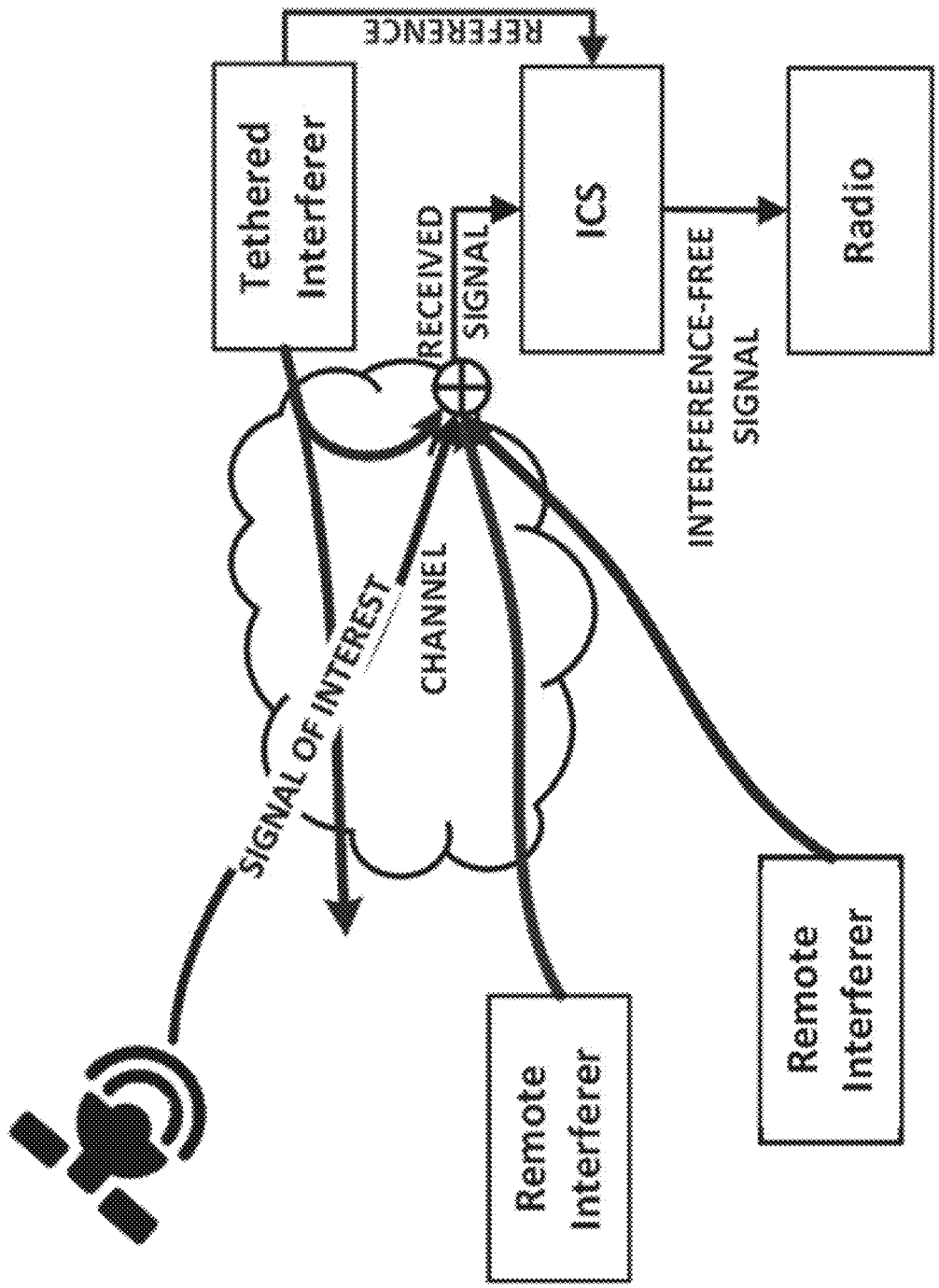
FIG. 1 shows an example of an interference cancellation system.

FIG. 1 illustrates an example of an interference cancellation system. As shown therein, the SATCOM SOI is received in the presence of a tethered interferer (which provides a reference interference signal to the IC system) and one or more remote interferers. Embodiments of the disclosed technology are directed to interference cancellation of high-power input signals in the analog domain. In an example, this may be achieved based on a cancel-first architecture that achieves low noise-figure and high linearity for simultaneous cancellation of high-powered collocated interference and weaker remote interference.

In an example, Table 1 shows example performance of the interference cancellation system shown in FIG. 1 for a 25 kHz waveform.

TABLE 1

Example performance of an interference cancellation system

| Interference type, incident power | In-band cancellation | Out-of-band cancellation |
|---|---|---|
| Tethered, 15 dBm or higher | 103 dB | 163 dB |
| Remote, −5 dBm or higher | 68 dB | 133 dB |

Traditional IC architectures are unable to achieve the simultaneous excision of a combination of high-powered and low-powered interference with low NF and high linearity. In an example, the amplify-first architecture of FIG. 2A offers low NF, but cannot handle the high-powered IC requirements without nonlinear distortion: the typical 1 dB compression point (P1 dB) of state-of-the-art commercial off-the-shelf (COTS) low-noise amplifiers (LNAs) is no more than 25 dBm, which would translate to strong harmonic and intermodulation artifacts even with a modest first-stage gain of 10 dB when the local interference is as strong as 15 dBm. In another example, the filter-first architecture of FIG. 2B can reject high-powered out-of-band interference, but suffers high insertion loss (typically −5 dB when conforming to size, weight and power requirements of mobile/on-the-halt operation), thereby compromising radio receiver sensitivity. In these examples, without the use of an analog interference canceller (AIC), the in-band interference cancellation capability is limited by the clean dynamic range of the available data converters, and subject to additional performance penalty due channel estimation/tracking errors that plague traditional digital cancellation methods.

Figure 2A:
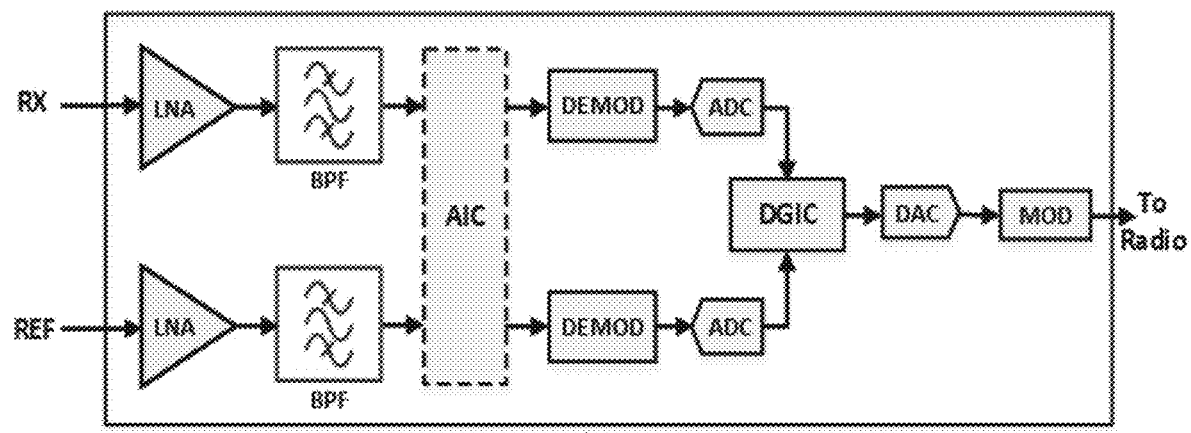
FIGS. 2A and 2B show examples of interference cancellation architectures.
Figure 2B:
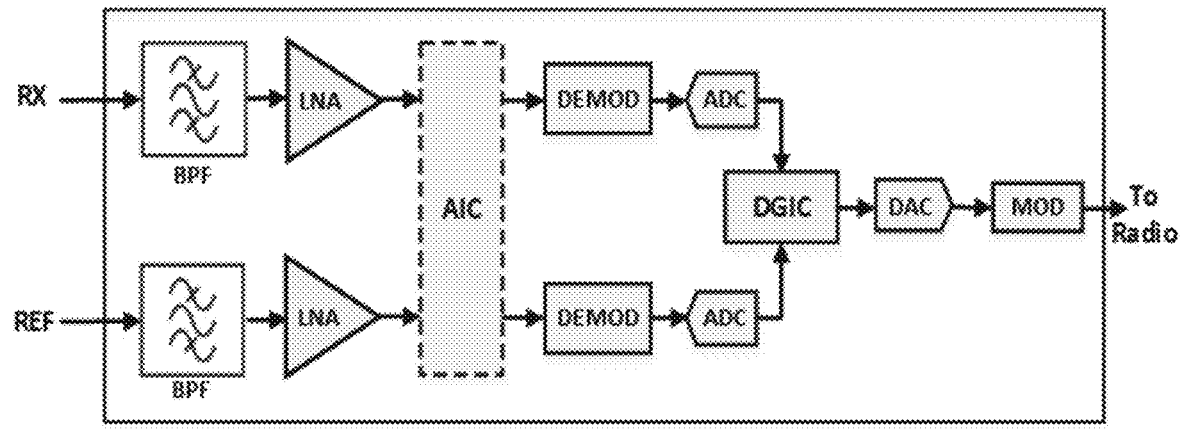

Existing systems (e.g., as shown in FIGS. 2A and 2B) typically support a maximum input power of −15 dBm to −10 dBm. If the input power were higher, the existing systems can only attenuate the received signal, which degrades the noise figure, thereby adversely affecting demodulation and decoding performance in the receiver.

Figure 3:
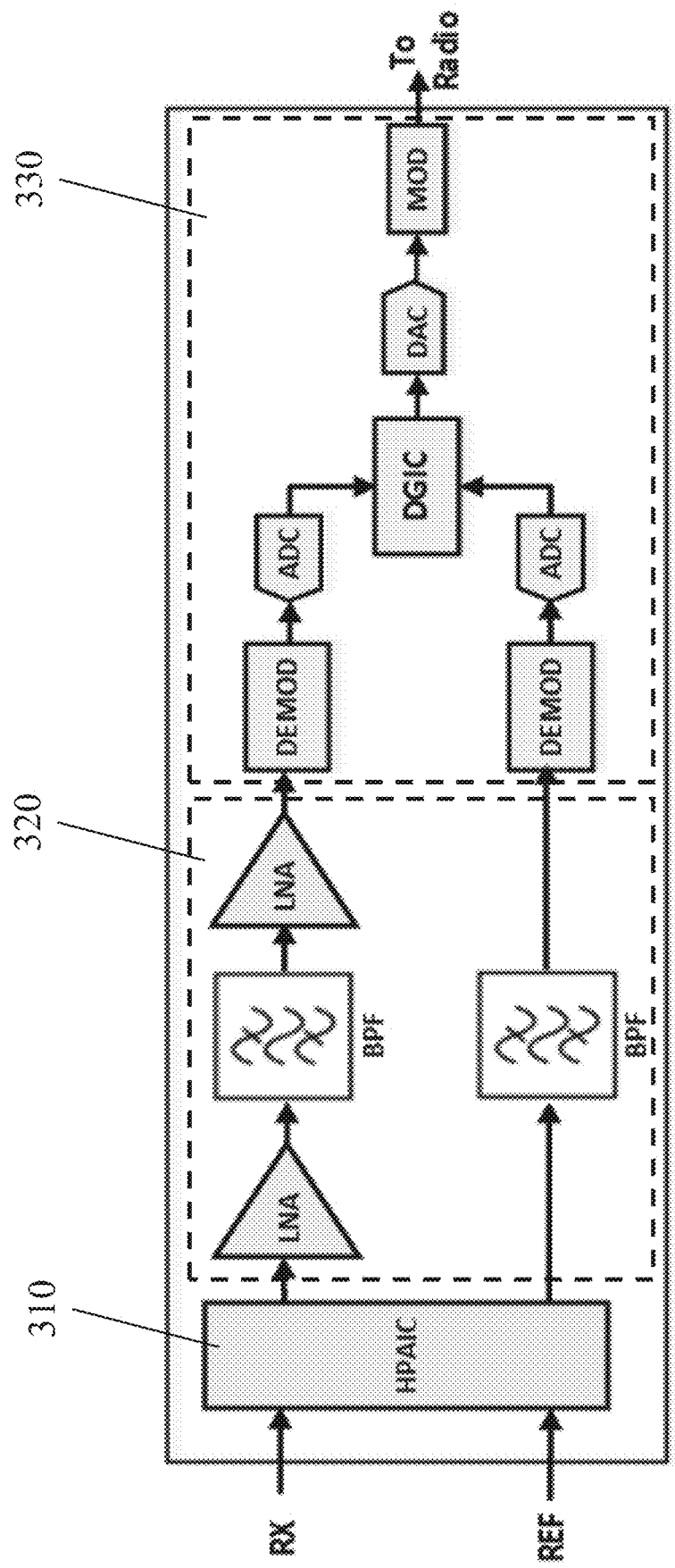
FIG. 3 shows an example of a cancel-first interference cancellation architecture.

Embodiments of the disclosed technology are directed to a cancel-first architecture, an example of which is shown in FIG. 3, which addresses the unfavorable NF-linearity trade-off associated with the traditional architectures. In the presence of a strong collocated interferer, the high-power analog interference canceller (HPAIC) 310 operates as the first RF stage, providing more than 30 dB of in-band and out-of-band interference rejection with less than 1 dB of insertion loss. The reduced interference power at the output of the HPAIC allows subsequent amplification and filtering of the out-of-band interferer 320 with relaxed requirements, so that SOI level can be restored while maintaining receiver linearity. The highly-linear residual interference is further rejected by more than 50 dB using the tethered IC capability of a digital interference canceller (DGIC) 330.

In some embodiments, the DGIC also incorporates tetherless interference cancellation capability that addresses a large class of interferers resulting from remote red/blue tactical jammers in a manner that is agnostic to the nature of harmonic distortion that brings unwanted out-of-band energy in-band. The digital cancellation of the residual collocated interference and the remote interference takes place concurrently, with negligible performance penalty compared to either IC capability operating in the presence of the respective interference type alone.

In some embodiments, the HPAIC 310 can be integrated into a joint analog and digital interference cancellation (JADIC) system, which can be configured to operation in the UHF band (e.g., 241-271 MHz) and capable of (a) 64 dB wideband cancellation over 30 MHz bandwidth, (b) supporting receivers with high-sensitivity (e.g., below −120 dB), and (c) being agnostic to the type of interference (e.g., swept tone, modulated Gaussian). In an example, the HPAIC can be used as the analog interference cancellation subsystem in the JADIC system.

In some embodiments, the HPAIC 310 can be integrated into a radio with full-duplex capabilities. In an example, the full-duplex radio that incorporates the HPAIC can be configured to operate in UHF and L bands with one or more of (a) same frequency simultaneous transmit and receive (SF-STAR) capabilities, (b) 130-150 dB self-interference suppression (e.g., which includes both isolation and interference cancelation) over 20 MHz bandwidth, and (c) embedded tethered analog interference cancellation and tethered digital interference cancellation. In an example, the HPAIC can be used in the SF-STAR framework to achieve simultaneous transmission and reception in the same frequency (or frequency band).

In some embodiments, the HPAIC 310 can be integrated into a system with periodic interference estimation (PIE) capabilities. In an example, the PIE system can be configured with (a) remote interference cancellation capabilities and (b) the ability to achieve 45 dB of cancellation of CW-tone and swept-tone interferers without a reference.

Figure 4A:
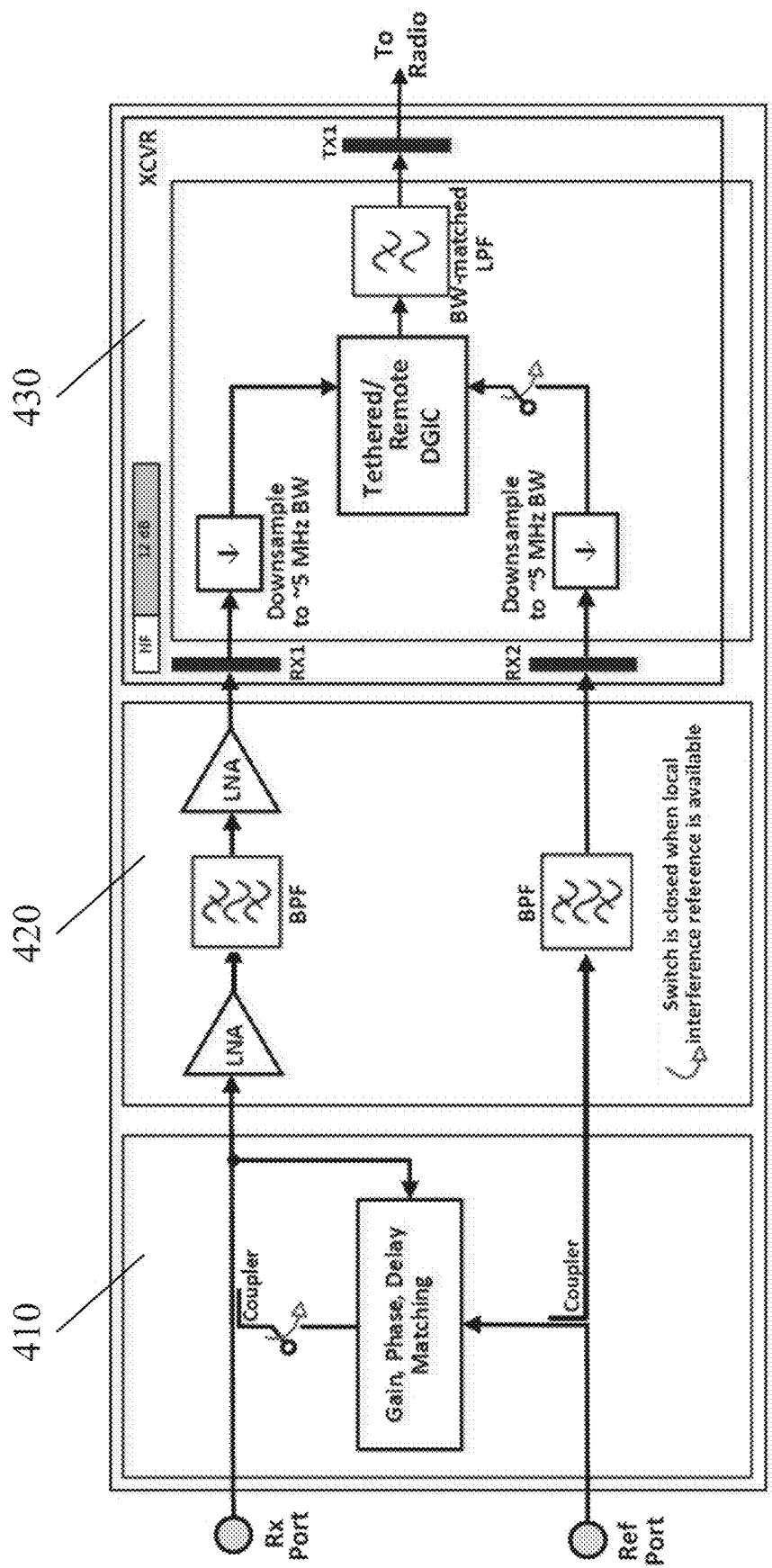
FIG. 4A shows a functional block diagram of an example interference cancellation system, along with in-band (INB) and out-of-band (OUB) interference cancellation performance.

FIG. 4A shows a functional block diagram of an example interference cancellation system that includes an HPAIC 410, RF amplification and filtering 420, and digital processing (also referred to as the integrated transceiver or FPGA) 430. As shown therein, the HPAIC 410 operates by modifying the interference reference (REF) in gain, phase and delay such that when it is coupled with the received path, the received interference component is largely cancelled. In order to maintain consistently high levels of cancellation through RF dynamics, the HPAIC implements a tuning circuit continually optimizing the configuration of matching parameters from a discrete set with fine resolution. In an example, the resolution may be 0.1 dB for gain, 1 picosecond for delay and 45 degrees for phase. In another example, the tuning circuit is configured based on power measurements taken at the output of the HPAIC. In yet another example, the tuning circuit is based on a brute force search over the parameter space, wherein the optimal parameters result in the maximum cancellation of the received interference component.

The embodiment described in FIG. 4A uses the HPAIC 410 on the front-end of the receiver (different from the traditional approaches shown in FIGS. 2A and 2B) to advantageously handle both a high-power interfering signal as well as a remote low-power interfering signal. As shown in FIG. 4A, the switch/arrow on the coupler is closed when a reference signal for the local interference is available. Analog cancellation of the high-power interfering signal is performed in the HPAIC 410, and then LNA-BPF-LNA architecture in the RF amplification and filtering stage 420 enables the remote low-power interfering signal to be mitigated while preserving the fidelity of the signal-of-interest (whose power is also significantly lower than that of the high-power interfering signal). The switch on the couples operates in conjunction with the switch in the DGIC 430 that implements the tethered DGIC for the high-power interfering signal and the remote DGIC for the remote low-power interfering signal.

In some embodiments, the HPAIC 410 can support in-band (INB) and out-of-band (OUB) interference cancellation performance for local (LOC) and remote (REM) interference as shown in Table 2 below.

TABLE 2

HPAIC interference cancellation performance

|  | LOC | REM |
|---|---|---|
| INB | 30 dB | 0 dB |
| OUB | 30 dB | 0 dB |
| NF | 1 dB | 0 dB |

In some embodiments, the tuning circuit is updated (e.g., a new set of values for the parameter is determined) when the measured input power crosses a predetermined threshold, which is indicative of a changing RF environment, e.g. due to mobility.

As shown in FIG. 4A, the RF amplification and filtering stage 420 following the HPAIC 410 on the signal path is a gain stage using state-of-the-art LNAs providing 20 dB of gain and 0.5 dB NF. With an input-referred P1 dB of +2 dBm, the first gain stage can amplify a signal of −15 dBm power with near-perfect linearity, with nonlinear (compression) artifacts below X dBm at its output. The output of the first gain stage is then band-pass filtered to reject out-of-band energy by at least 50 dB, with insertion loss low enough (<15 dB) to have minimal impact on the overall NF. With the dominant out-of-band signal rejected by at least 50 dB, more dynamic range can be accessed for another stage of linear amplification prior to demodulation.

In some embodiments, the RF amplification and filtering stage 420 can support in-band (INB) and out-of-band (OUB) interference cancellation performance for local (LOC) and remote (REM) interference as shown in Table 3 below.

TABLE 3

RF Stage interference cancellation performance

|  | LOC | REM |
|---|---|---|
| INB |  | 0 dB |
| OUB |  | 50 dB |
| NF |  | <1 dB |

In some embodiments, an integrated transceiver (XCVR) 430 can be used to perform demodulation and modulation functions. In an example, the integrated XCVR includes dual receive and transmit capability, which allows for the demodulation and digitization of the HPAIC output and of the reference analog signal via the two receivers (RX1 and RX2) simultaneously. The output of the digital interference canceller (DGIC) is modulated using the transmitter (TX1) function of the XCVR and fed to the tactical radio. The digital-to-analog conversion (DAC), analog-to-digital conversion (ADC) and the transmit/receive frequency mixing functions of the integrated XCVR are all referenced from the same clock, which advantageously does not introduce any frequency error on the signal.

In some embodiments, the DGIC (e.g., shown in FIG. 4A) integrates both tethered and remote interference cancellation capabilities. The tethered canceller further rejects the residual in-band interference at the output of the HPAIC. The tethered DGIC uses advanced signal processing methods for estimating and tracking the effective channel response between the reference and the received interference, due to uncancelled multipath components which may exhibit time-variation. In an example, the tethered DGIC can be configured to deliver 50+dB digital cancellation, providing significant (10-20 dB) gain over cancellation with standard adaptive signal processing techniques.

The DGIC also integrates remote interference cancellation capability that operates concurrently with tethered cancellation of local interference. In an example, the remote canceller includes periodic interference estimation, which is designed to cancel interference with strong periodic features, e.g. those associated with continuous-wave (CW) tones and swept-tones, without the need for a reference copy.

In some embodiments, the DGIC runs at a WHz sample rate, accommodating tethered and tetherless digital interference cancellation up to W Hz RF bandwidth, and the last LPF stage can be configured to achieve an additional (W/Wo) rejection when operating with a cancellation bandwidth of Wo Hz.

In some embodiments, the integrated XCVR 430 can support in-band (INB) and out-of-band (OUB) interference cancellation performance for local (LOC) and remote (REM) interference as shown in Table 4 below (wherein * indicates an additional 23 dB of in-band rejection for 25 kHz tactical satellite).

TABLE 4

Integrated XCVR interference cancellation performance

|  | LOC | REM |
|---|---|---|
| INB | 50* dB | 45* dB |
| OUB | 60 dB |  |
| NF | 0 dB |  |

Figure 4B:
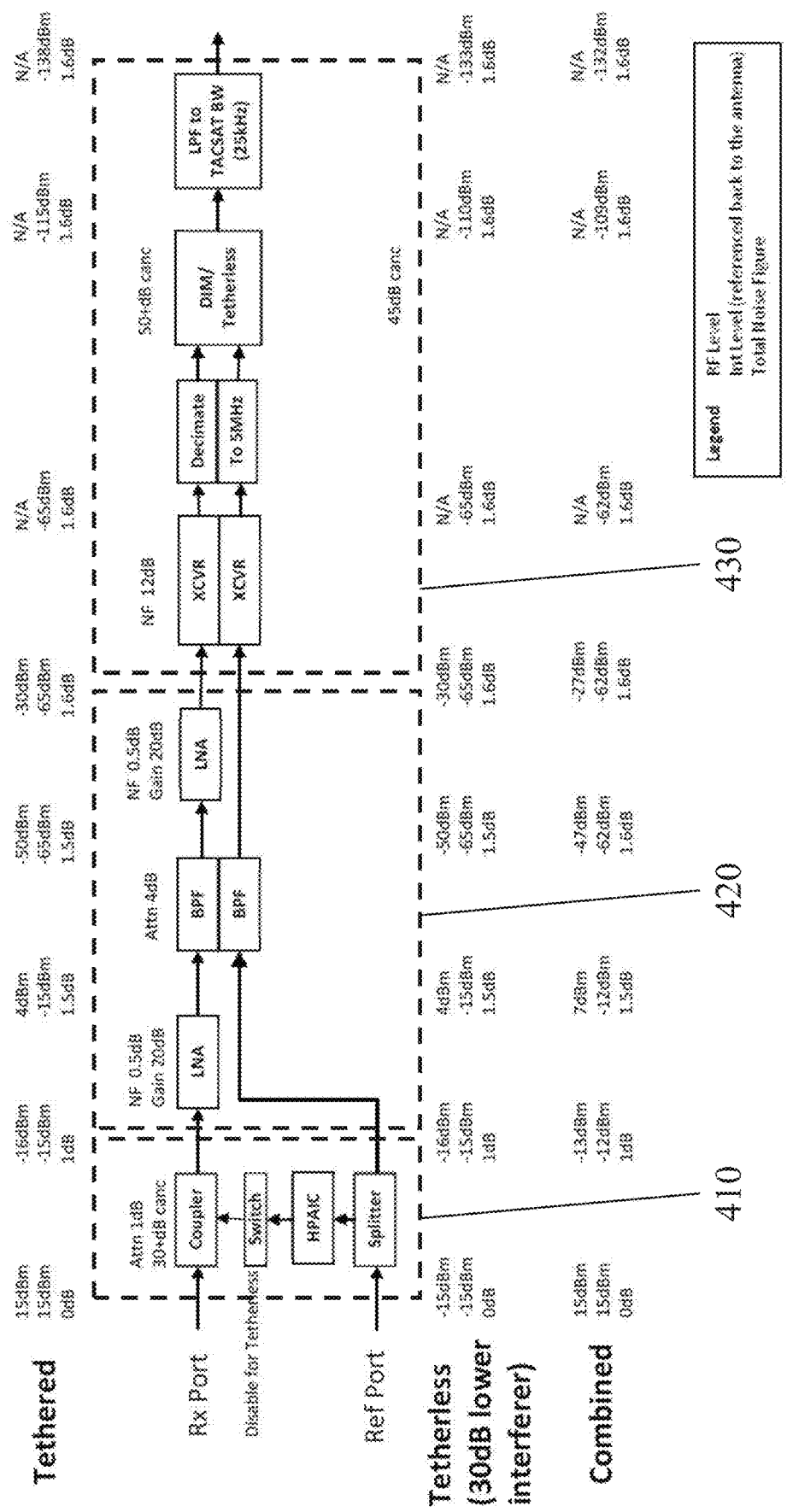
FIG. 4B shows an example of an interference cancellation system with a nominal RF level, an interference level and a noise figure at each stage of the system.

FIG. 4B shows an example of an interference cancellation system with a nominal RF level (in dBm), an interference level (in dBm) and a noise figure (in dB) at each stage of the system, which includes the HPAIC 410, the RF amplification and filtering stage 420, and the digital transceiver with the DGIC 430. As shown therein, the interference cancellation system can be configured to support both tethered and tetherless interference cancellation with the tetherless interferer being, in this example, 30 dB lower than the high-power tethered interferer. The low-noise amplifiers in the RF amplification and filtering stage 420 are selected to have noise figures of less than 1 dB (with a 0.5 dB NF in this example).

The architectures described in FIGS. 3 and 4A, with the corresponding analysis shown in FIG. 4B, are design to be implemented with commercial off-the-shelf (COTS) products that can be easily installed and interoperate with existing system components. The described embodiments enable the cancellation of high-power interference in the analog domain using the architectures in FIGS. 3 and 4A, while maintaining a low noise figure and high linearity.

Figure 5:
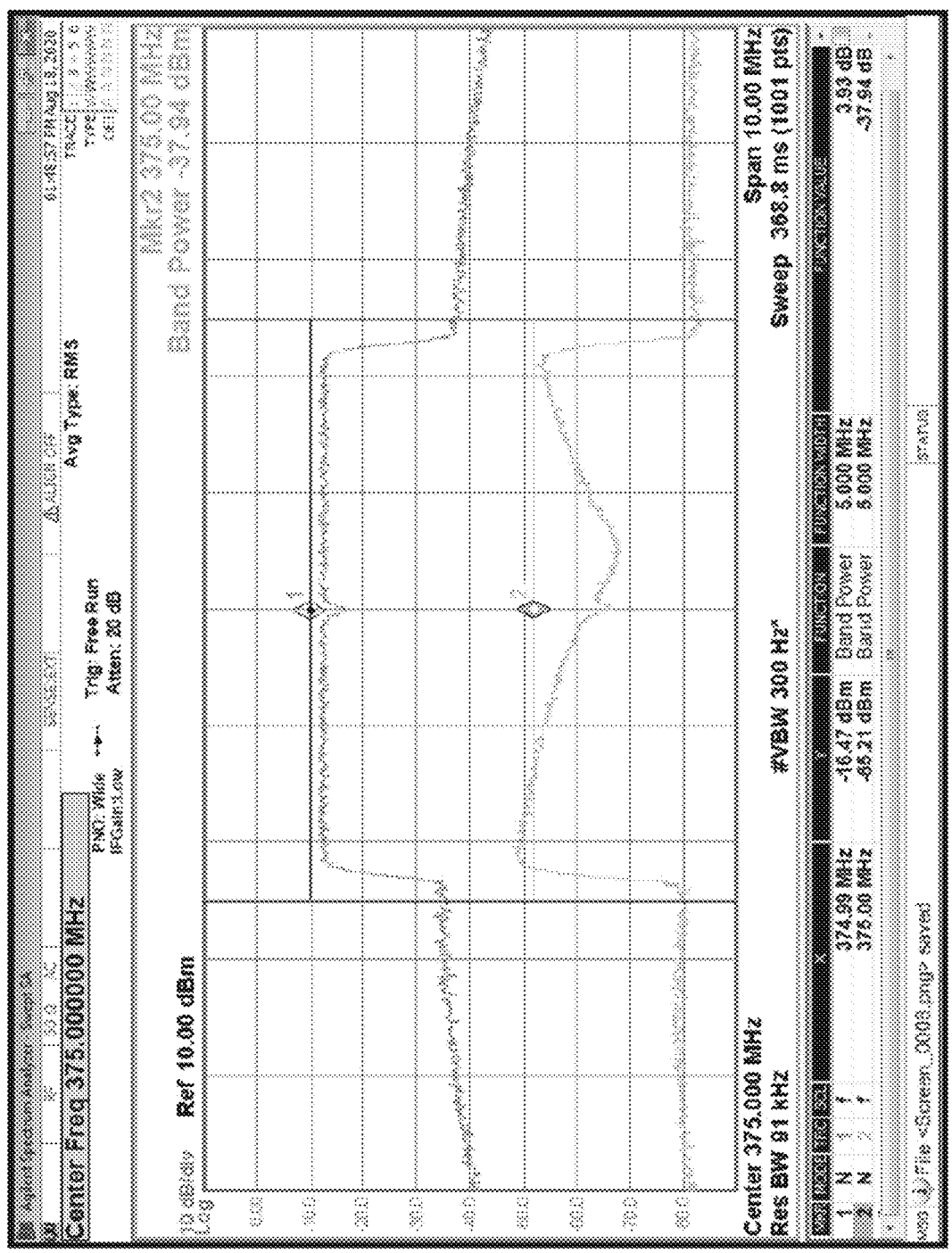
FIG. 5 shows an example of interference cancellation in a lab environment.

In an example, FIG. 5 displays the performance of the HPAIC, delivering more than 42 dB wideband cancellation in a lab environment at 375 MHz, emulating stationary (benign) RF conditions. In real-world dynamic RF environments, the HPAIC can achieve more than 30 dB cancellation of both the in-band and out-of-band interference. As with any tethered analog canceller, the output of the HPAIC will exhibit residual interference due to finite resolution of the matching elements, the noise on the reference path and residual errors in channel estimation/tracking. However, unlike other existing analog canceller, the HPAIC maintains linearity while cancelling high-powered interference, facilitating further excision of the residual interference using subsequent digital cancellation stages. For an interference level of 15 dBm at the antenna, the total signal level at the output of the HPAIC will be reduced to below −15 dBm.

Figure 6:
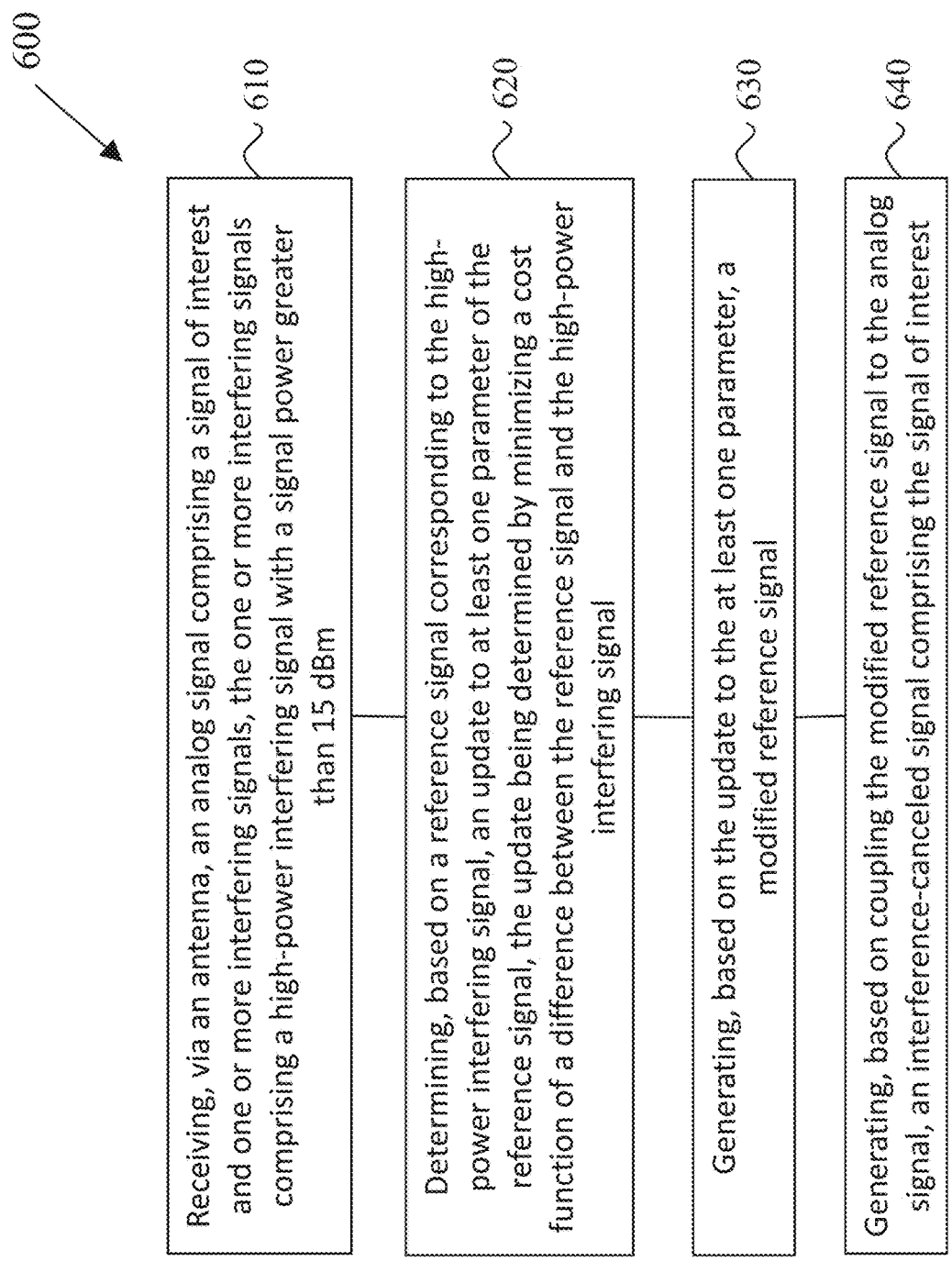
FIG. 6 is a flowchart of an example method of high-power analog interference cancellation.

FIG. 6 is a flowchart of an example method 600 of high-power analog interference cancellation. The method 600 includes, at operation 610, receiving, via an antenna, an analog signal comprising a signal of interest and one or more interfering signals, the one or more interfering signals comprising a high-power interfering signal with a signal power greater than 15 dBm. In some embodiments, the signal power may be greater than 0 dBm, whereas in other embodiments, the signal power may be in the range −15 dBm to 50 dBm.

The method 600 includes, at operation 620, determining, based on a reference signal corresponding to the high-power interfering signal, an update to at least one parameter of the reference signal, the update being determined by minimizing a cost function of a difference between the reference signal and the high-power interfering signal, and the at least one parameter comprising a gain, a phase, or a delay. In some embodiments, the cost function comprises a difference between the respective parameters of the reference and the high-power interfering signals. In other embodiments, the cost function is a mean-squared error between the reference signal and the high-power interfering signal.

In some embodiments, the reference signal corresponding to the high-power interfering signal is a tethered signal. In other embodiments, the reference signal corresponding to the high-power interfering signal is a tetherless signal.

The method 600 includes, at operation 630, generating, based on the update to the at least one parameter, a modified reference signal.

The method 600 includes, at operation 640, generating, based on coupling the modified reference signal to the analog signal, an interference-canceled signal comprising the signal of interest.

In some embodiments, the gain and the delay of the modified reference signal is substantially similar to the gain and the delay of the high-power interfering signal, and the phase of the modified reference signal is substantially inverted with respect to the phase of the high-power interfering signal. In an example, the gain and the delay of the modified reference signal being substantially similar to the gain and the delay of the high-power interfering signal is up to the resolution of the step size being used (e.g., gain value increment of 0.1 dB or 0.05 dB, and delay value increment of 1 picosecond or 100 femtoseconds). Similarly, the phase of the modified reference signal being substantially inverted with respect to the phase of the high-power interfering signal is based on one or both of the resolution of the step size being used (e.g., phase increment of 45 degrees, 22.5 degrees, 10 degrees, or 5 degrees) and the mismatch between the gain and delay values (e.g., a nominal inversion of 180 degrees may be slightly different to account for a mismatch due to the resolutions of the gain and delay values).

In some embodiments, the one or more interfering signals further comprises at least one remote interfering signal with a signal power of −5 dBm or higher. In other embodiments, the signal power of the at least one remote interfering signal of −50 dBm or higher. In yet other embodiments, the signal power of the at least one remote interfering signal is a lower than the signal power of the high-power interfering signal by a predetermined amount.

In some embodiments, determining the at least one parameter is based on a discrete set of gain values, a discrete set of phase values, or a discrete set of delay values.

In some embodiments, an increment for the discrete set of gain values is 0.1 dB, an increment for the discrete set of phase values is 45 degrees, and an increment for the discrete set of delay values is 1 picosecond. In other embodiments, the discrete set of gain, phase, and delay values can be increased by reducing the increment.

In some embodiments, determining the at least one parameter comprises a brute force search over the discrete set of gain values, phase values, and delay values.

In some embodiments, determining the at least one parameter is further based on one or more power measurements of the interference-canceled signal.

In some embodiments, the method 600 further includes the operations of performing amplification and filtering operations on the interference-canceled signal to generated an amplified and filtered interference-canceled signal, and performing a digital interference cancellation operation on the amplified and filtered interference-canceled signal to concurrently mitigate effects of each of the one or more interfering signals.

In some embodiments, the tethered and tetherless digital cancellation methods are performed in an iterative fashion. In an example, the DGIC first mitigates the residual interference due to the local interferer, followed by tetherless mitigation of the remote interferer. Once a first digital mitigation of the remote interference is performed, the tethered digital canceller can be performed again, initiating a second round of iteration.

In some embodiments, the high-power interfering signal is an output of swept-tone jammer. In other embodiments, the remote interfering signal is also an output of a swept-tone jammer. In an example, the two jammers may be substantially similar parameters. In another example, the two jammers may have different parameters.

Embodiments of the disclosed technology are directed to a device for interference cancellation that includes a high-power analog interference canceller configured to receive (a) a first wireless signal comprising a signal of interest and one or more interfering signals and (b) a reference signal corresponding to a first interfering signal of the one or more interfering signals, wherein the first interfering signal is a high-power interfering signal with a signal power greater than 15 dBm, and output an interference-canceled signal comprising the signal of interest and a residual of the first interfering signal, a radio-frequency stage configured to amplify and filter the interference-canceled signal to generate an amplified and filtered interference-canceled signal, wherein the amplifying and filtering comprises boosting the signal of interest and removing out-of-band interference, and a digital interference canceller configured to perform a digital interference cancellation operation on the amplified and filtered interference-canceled signal.

In some embodiments, tuning the high-power analog interference canceller is jointly performed with tuning the digital interference canceller.

In some embodiments, a first of the one or more interfering signals is the high-power interfering signal that is an output of a collocated swept-tone jammer (and thus, has an available reference signal) and a second of the one or more interfering signals is an output of a remote swept-tone jammer (and thus, does not have a reference signal available). In an example, the HPAIC can be configured to significantly reduce the deleterious effects of the first interfering signal and the DGIC can be configured to mitigate the second interfering signal.

As described in this patent document, embodiments of the disclosed technology solve the technical problem of demodulating and decoding a low-power information signal in the presence of high-power interference by using high-power analog interference cancellation.

Preferred embodiments of the disclosed technology are enumerated in the following solution listing:

1. A method of interference cancellation, comprising receiving, via an antenna, an analog signal comprising a signal of interest and one or more interfering signals, wherein the one or more interfering signals comprises a high-power interfering signal with a signal power greater than 15 dBm, determining, based on a reference signal corresponding to the high-power interfering signal, an update to at least one parameter of the reference signal, wherein the update is determined by minimizing a cost function of a difference between the reference signal and the high-power interfering signal, and wherein the at least one parameter comprises a gain, a phase, or a delay, generating, based on the update to the at least one parameter, a modified reference signal, and generating, based on coupling the modified reference signal to the analog signal, an interference-canceled signal comprising the signal of interest.

2. The method of solution 1, wherein the gain and the delay of the modified reference signal is substantially similar to the gain and the delay of the high-power interfering signal, and the phase of the modified reference signal is substantially inverted with respect to the phase of the high-power interfering signal.

3. The method of solution 1, wherein the one or more interfering signals further comprises at least one remote interfering signal with a signal power of −5 dBm or higher.

4. The method of any of solutions 1 to 3, wherein determining the at least one parameter is based on a discrete set of gain values, a discrete set of phase values, or a discrete set of delay values.

5. The method of solution 4, wherein an increment for the discrete set of gain values is 0.1 dB, an increment for the discrete set of phase values is 45 degrees, and an increment for the discrete set of delay values is 1 picosecond.

6. The method of solution 5, wherein determining the at least one parameter comprises a brute force search over the discrete set of gain values, phase values, and delay values.

7. The method of solution 5, wherein determining the at least one parameter is further based on one or more power measurements of the interference-canceled signal.

8. The method of any of solutions 1 to 7, further comprising performing amplification and filtering operations on the interference-canceled signal to generated an amplified and filtered interference-canceled signal, and performing a digital interference cancellation operation on the amplified and filtered interference-canceled signal to concurrently mitigate effects of each of the one or more interfering signals.

9. The method of solution 8, wherein generating the interference-cancelled signal and performing the digital interference cancellation operation are performed multiple times in an iterative manner.

10. The method of any of solutions 1 to 7, wherein the high-power interfering signal is an output of swept-tone jammer.

11. A device for interference cancellation, comprising a high-power analog interference canceller configured to receive (a) a first wireless signal comprising a signal of interest and one or more interfering signals and (b) a reference signal corresponding to a first interfering signal of the one or more interfering signals, wherein the first interfering signal is a high-power interfering signal with a signal power greater than 15 dBm, and output an interference-canceled signal comprising the signal of interest and a residual of the first interfering signal, a radio-frequency stage configured to amplify and filter the interference-canceled signal to generate an amplified and filtered interference-canceled signal, wherein the amplifying and filtering comprises boosting the signal of interest and removing out-of-band interference, and a digital interference canceller configured to perform a digital interference cancellation operation on the amplified and filtered interference-canceled signal.

12. The device of solution 11, wherein tuning the high-power analog interference canceller is jointly performed with tuning the digital interference canceller.

13. The device of solution 11, wherein the high-power interfering signal is an output of swept-tone jammer.

14. An apparatus comprising a processor configured to implement one or more of the methods in any of solutions 1 to 10.

Figure 7:
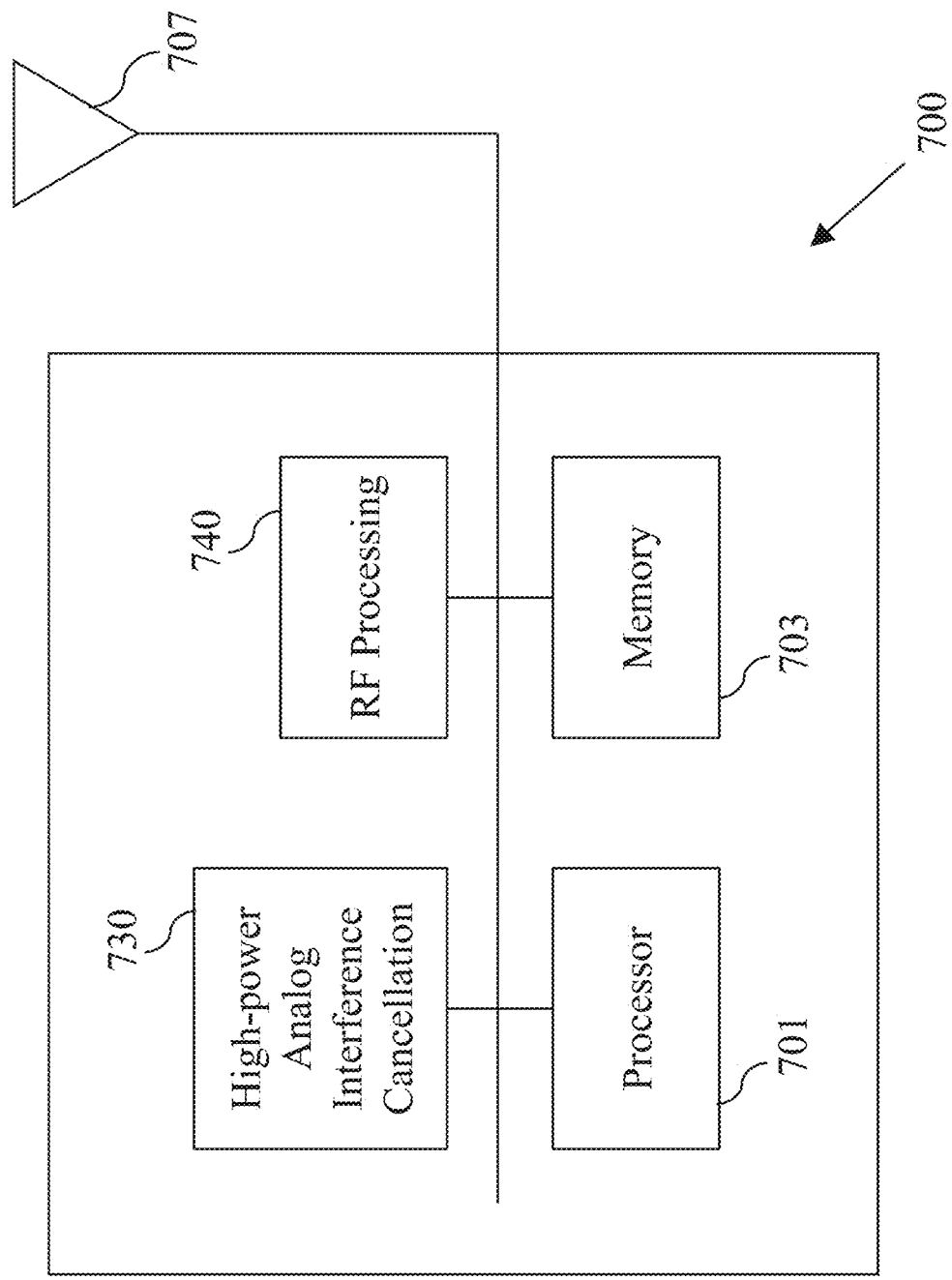
FIG. 7 is a block diagram representation of a portion of an apparatus that may implement a method or technique described in this patent document.

FIG. 7 is a block diagram representation of a portion of an apparatus, in accordance with some embodiments of the presently disclosed technology. An apparatus 700 can include a processor 701 (e.g., a microprocessor) that implements one or more of the techniques presented in this patent document. Apparatus 700 can include one or more memories 703 configured to store information such as data or instructions. The apparatus 700 can further include a high-power analog interference canceller (HPAIC) 730 and RF processing 740 that is communicatively coupled to the processor 701 and the memory 703. In some embodiments, the apparatus 700 may be further configured to send or receive wireless signals over one or more communication interfaces such as antenna(s) 720. In some embodiments, at least some of the disclosed techniques, modules or functions are implemented using the apparatus 700.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of interference cancellation, comprising:
    receiving, via an antenna, an analog signal comprising a signal of interest and one or more interfering signals, wherein the one or more interfering signals comprises a high-power interfering signal with a signal power greater than 15 dBm;
    determining, based on a reference signal corresponding to the high-power interfering signal, an update to at least one parameter of the reference signal, wherein the update is determined by minimizing a cost function of a difference between the reference signal and the high-power interfering signal, and wherein the at least one parameter comprises a gain, a phase, or a delay;
    generating, based on the update to the at least one parameter, a modified reference signal,
        wherein the phase of the modified reference signal is selected from a discrete set of phase values and is substantially inverted with respect to the phase of the high-power interfering signal,
        wherein the gain and the delay of the modified reference signal are substantially similar to the gain and the delay of the high-power interfering signal, respectively,
        wherein determining the phase of the modified reference signal is based on (a) an increment for the discrete set of phase values or (b) a mismatch between the gain and the delay of the modified reference signal and the gain and the delay of the high-power interfering signal; and
    generating, based on coupling the modified reference signal to the analog signal, an interference-canceled signal comprising the signal of interest.

2. The method of claim 1, wherein the one or more interfering signals further comprises at least one remote interfering signal with a signal power of −5 dBm or higher.

3. The method of claim 1, wherein determining the at least one parameter is based on a discrete set of gain values, the discrete set of phase values, or a discrete set of delay values.

4. The method of claim 3, wherein:
    an increment for the discrete set of gain values is 0.1 dB or 0.05 dB,
    the increment for the discrete set of phase values is 45 degrees, 22.5 degrees, 10 degrees, or 5 degrees, and
    an increment for the discrete set of delay values is 1 picosecond or 100 femtoseconds.

5. The method of claim 4, wherein determining the at least one parameter comprises a brute force search over the discrete set of gain values, phase values, and delay values.

6. The method of claim 4, wherein determining the at least one parameter is further based on one or more power measurements of the interference-canceled signal.

7. The method of claim 1, further comprising:
performing amplification and filtering operations on the interference-canceled signal to generate an amplified and filtered interference-canceled signal; and
performing a digital interference cancellation operation on the amplified and filtered interference-canceled signal to concurrently mitigate effects of each of the one or more interfering signals.

8. The method of claim 7, wherein generating the interference-canceled signal and performing the digital interference cancellation operation are performed multiple times in an iterative manner.

9. The method of claim 1, wherein the high-power interfering signal is an output of a swept-tone jammer.

10. A device for interference cancellation, comprising:
a high-power analog interference canceller configured to
receive (a) a first wireless signal comprising a signal of interest and one or more interfering signals and (b) a reference signal corresponding to a first interfering signal of the one or more interfering signals, wherein the first interfering signal is a high-power interfering signal with a signal power greater than 15 dBm,
generate, based on the reference signal, a modified reference signal,
wherein a phase of the modified reference signal is selected from a discrete set of phase values and is substantially inverted with respect to the phase of the high-power interfering signal,
wherein a gain and a delay of the modified reference signal are substantially similar to the gain and the delay of the high-power interfering signal, respectively,
wherein determining the phase of the modified reference signal is based on (a) an increment for the discrete set of phase values or (b) a mismatch between the gain and the delay of the modified reference signal and the gain and the delay of the high-power interfering signal,
output, based on coupling the modified reference signal to the first wireless signal, an interference-canceled signal comprising the signal of interest and a residual of the first interfering signal;
a radio-frequency stage configured to amplify and filter the interference-canceled signal to generate an amplified and filtered interference-canceled signal, wherein amplifying and filtering the interference-canceled signal comprises boosting the signal of interest and removing out-of-band interference; and
a digital interference canceller configured to perform a digital interference cancellation operation on the amplified and filtered interference-canceled signal.

11. The device of claim 10, further comprising:
a tuning circuit configured to jointly perform tuning the high-power analog interference canceller and tuning the digital interference canceller.

12. The device of claim 10, wherein the high-power interfering signal is an output of a swept-tone jammer.

13. An apparatus for interference cancellation, comprising:
an antenna configured to receive an analog signal comprising a signal of interest and one or more interfering signals, wherein the one or more interfering signals comprises a high-power interfering signal with a signal power greater than 15 dBm; and
a processor, coupled to the antenna, configured to:
determine, based on a reference signal corresponding to the high-power interfering signal, an update to at least one parameter of the reference signal, wherein the update is determined by minimizing a cost function of a difference between the reference signal and the high-power interfering signal, and wherein the at least one parameter comprises a gain, a phase, or a delay,
generate, based on the update to the at least one parameter, a modified reference signal,
wherein the phase of the modified reference signal is selected from a discrete set of phase values and is substantially inverted with respect to the phase of the high-power interfering signal,
wherein the gain and the delay of the modified reference signal are substantially similar to the gain and the delay of the high-power interfering signal, respectively,
wherein determining the phase of the modified reference signal is based on (a) an increment for the discrete set of phase values or (b) a mismatch between the gain and the delay of the modified reference signal and the gain and the delay of the high-power interfering signal, and
generate, based on coupling the modified reference signal to the analog signal, an interference-canceled signal comprising the signal of interest.

14. The apparatus of claim 13, wherein determining the at least one parameter is based on a discrete set of gain values, the discrete set of phase values, or a discrete set of delay values.

15. The apparatus of claim 14, wherein;
an increment for the discrete set of gain values is 0.1 dB or 0.05 dB,
the increment for the discrete set of phase values is 45 degrees, 22.5 degrees, 10 degrees, or 5 degrees, and
an increment for the discrete set of delay values is 1 picosecond or 100 femtoseconds.

16. The apparatus of claim 15, wherein determining the at least one parameter comprises a brute force search over the discrete set of gain values, phase values, and delay values.

17. The apparatus of claim 15, wherein determining the at least one parameter is further based on one or more power measurements of the interference-canceled signal.

18. The apparatus of claim 13, further comprising:
a low-noise amplifier (LNA) configured to perform an amplification operation on the interference-canceled signal to generate an amplified interference-canceled signal; and
a bandpass filter (BPF) configured to filter the amplified interference-canceled signal to generate an amplified and filtered interference-canceled signal,
wherein the processor is further configured to:
perform a digital interference cancellation operation on the amplified and filtered interference-canceled signal to concurrently mitigate effects of each of the one or more interfering signals, and
wherein generating the interference-canceled signal and performing the digital interference cancellation operation are performed multiple times in an iterative manner.

\* \* \* \* \*